United States Patent [19]
Osada

[11] Patent Number: 5,629,989
[45] Date of Patent: May 13, 1997

[54] IMAGE LINE-SEGMENT EXTRACTING APPARATUS

[75] Inventor: Taku Osada, Saitama, Japan

[73] Assignee: Honda Giken Kogyo Kabushiki Kaisha, Tokyo, Japan

[21] Appl. No.: 229,371

[22] Filed: Apr. 18, 1994

[30] Foreign Application Priority Data

Apr. 27, 1993 [JP] Japan ................... 5-135718

[51] Int. Cl.⁶ .................................................. G06K 9/00
[52] U.S. Cl. ............................................ 382/281; 382/168
[58] Field of Search ................................. 382/193, 199,
382/202, 281, 192, 194, 168, 169, 170,
171, 172, 190, 191, 195, 201, 203, 204,
205, 224, 266, 268, 269, 286, 141, 151;
364/413.13, 413.23, 725, 478.01

[56] References Cited

U.S. PATENT DOCUMENTS

| | | | |
|---|---|---|---|
| 3,069,654 | 12/1962 | Hough | 382/281 |
| 4,707,647 | 11/1987 | Coldren et al. | 382/281 |
| 4,731,860 | 3/1988 | Wahl | 382/281 |
| 5,055,682 | 10/1991 | Takeo | 250/327 |
| 5,081,580 | 1/1992 | Takeo | 364/413 |

FOREIGN PATENT DOCUMENTS 6474680  3/1989  Japan ..................... 15/70

Primary Examiner—Leo Boudreau
Assistant Examiner—Bijan Tadayon
Attorney, Agent, or Firm—Lyon & Lyon LLP

[57] ABSTRACT

An image line-segment extracting apparatus which in processing steps to conduct Hough transformation of a sequence of edge pixels composing an image, to plot a histogram based on Hough function values, to successively detect peaks from the histogram and to extract a plurality of line segments existing in the image, can detect the only true peaks, effectively eliminating false peaks. The process also includes a feature by which region is defined and the amount of influence of a remarkable one of the peaks in a histogram upon frequency distribution on the histogram are determined and then histogram frequency values of other peaks in the defined region are corrected according to the determined amount of influence to partially rewrite the histogram.

3 Claims, 9 Drawing Sheets

5,629,989

IMAGE LINE-SEGMENT EXTRACTING APPARATUS

BACKGROUND OF THE INVENTION

The present invention relates to an image line-segment extracting apparatus which is capable of extracting line segments from a picture image by applying the Hough transformation method.

Each dot (x, y) in a sequence of pixels composing a line segment L in a two-dimensional system of the Cartesian coordinates (x, y), as shown for example in FIG. 6, can be transformed into a curve represented by a Hough function in terms of ($\rho = x^*\cos\theta + y^*\sin\theta$) with Hough coordinates ($\rho, \theta$) as shown in FIG. 7. The curves intersect each other at a point (dot) Po ($\rho o, \theta o$) with the Hough coordinates ($\rho, \theta$). The intersection point Po represents a straight line including the line segment L shown in the two-dimensional system of the coordinates (x, y).

When a histogram is plotted for values of the functions of the dots composing the line segment L, the above-mentioned intersection point Po can be determined by detecting a peak of the maximum frequency (occurrence) on the histogram. Consequently, it is possible to recognize that the line segment L is a sequence of dots (pixels) with their coordinates (x, y), which corresponds to Hough function curves passing through the intersect ion point Po (a peak on the histogram).

On the basis of the above-described conception, such an image line-segment extracting apparatus has been developed, which is capable of extracting line segments from a picture image by conducting the following steps: a sequence of dots composing an edge of an image, which is obtained by differential processing of a digitized image composed of pixels, is transformed into curves of Hough functions; a histogram is plotted for the values of the Hough functions; a peak of frequency on the histogram is detected; and a line segment corresponding to the detected peak is extracted from the picture image.

The thus constructed apparatus, however, encounters a trouble that, in case of an image including two or more line segments, Hough functions of the line segments interfere with each other to locally produce false peaks on their histograms, which interfere with extraction of each line segment corresponding to a true peak (a peak produced by a line segment really existing in the image).

In other words, when an image includes a plurality of line segments, Hough function curves of the line segments intersect with each other to produce false peaks near each true peak corresponding to the intersection point of Hough function curves of a line segment to be extracted.

For example, in the prior art methods when dots Q1 to Q4 at both ends of line segments La, Lb and Lc with coordinates (x, y) shown in FIG. 8 are transformed by Hough transform method, thereby the Hough function curves C1 to C4 with Hough coordinates ($\rho, \theta$) shown in FIG. 9 are obtained.

In FIG. 9, the Hough's function curves C1, C2, C3 and C4 correspond to the dots Q1, Q2, Q3 and Q4 respectively. Pa, Pb and Pc indicate true peaks of a histogram, which correspond to the line segments La, Lc and Lc respectively.

The histogram may include many false peaks that may appear as indicated by black squares in FIG. 9. These false peaks appear mostly in regions wherein the true peaks Pa, Pb and Pc corresponding to the respective line segments La, Lb and Lc influence on each other. Some of these false peaks may have larger values of histogram frequency than those of the true peaks Pa and Pc.

Accordingly, an attempt to successively extract the line segments existing in the image by subsequently detecting peaks on the histogram according to frequency in descending order may result in the selection of false peaks because of their frequency values being larger than those of the true peaks.

To prevent this, a prior art system employs the following method that is disclosed in Japanese laid-open patent publication No. 74680 of 1988:

Based on the fact that the maximum peak on a histogram surely corresponds to a line segment in an image, the prior art detects the maximum peak first from the histogram and, at the same time, determines all Hough function curves passing through the detected peak point, then it plots a new histogram from which the determined curves are eliminated and detects therefrom the second maximum peak.

However, the above-mentioned method requires a large amount of calculation for newly plotting a histogram to eliminate false peaks at every time of detecting a maximum peak from a histogram, causing the processing system to be overloaded.

SUMMARY OF THE INVENTION

In view of the foregoing, the present invention was made to provide a line-segment extracting apparatus which is capable of partially rewriting a histogram by determining a region and an amount of influence of a remarkable peak upon frequency distribution on the histogram and corrects frequency values of other peaks in the defined region according to the determined amount of the remarkable peak's influence to effectively eliminate false peaks from the histogram in the case of successively extracting line segments from the picture image, utilizing the fact that false peaks appear locally near the true peaks on the histogram.

DESCRIPTION OF THE PREFERRED EMBODIMENTS

Figure 1:
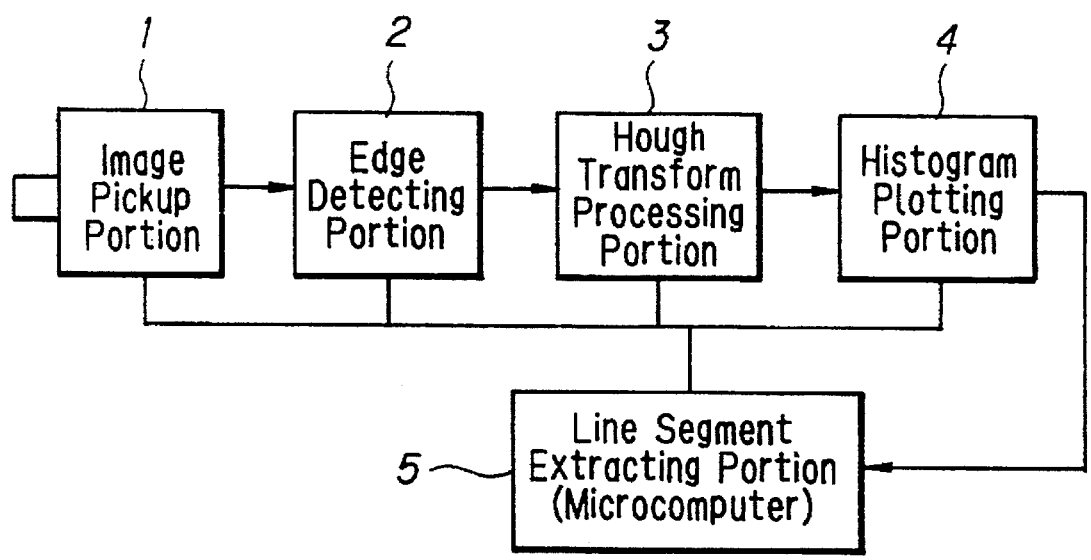
FIG. 1 is a block diagram showing a structure of an image line-segment extracting apparatus embodying the present invention.

Referring now to the drawings, a preferred embodiment of the present invention will be described in detail as follows:

It will be observed from FIG. 1 that an image line-segment extracting apparatus according to the present invention basically comprises: an image pick-up portion 1; an edge detecting portion 2 for detecting an edge of the image transmitted from the image pick-up portion 1 by differentiating a digitized image consisting of pixels; a Hough transform portion 3 for transforming a sequence of dots composing the detected edge in an image into Hough function curves; a histogram plotting portion 4 for making a histogram of Hough function values; and a line-segment extracting portion 5 consisting of a microcomputer which detects a frequency peak of the histogram and selects and extracts a line-segment from the image, judging that a sequence of dots composing the image edge corresponding to the Hough function curves passing the detected peak is the line segment, and which also conducts the concentrated control of the whole system of the apparatus.

The thus constructed apparatus according to the present invention is featured by the line-segment extracting portion which employs means to determine a region and an amount of influence of a remarkable peak upon frequency distribution of a histogram plotted by the histogram plotting portion 4, means to judge whether detected peaks other than the remarkable peak lie in the region or not and means to correct frequency values of the other peaks judged to be in the defined region according to the determined amount of influence.

In the image pick-up portion 1, a picture image of 512×512 pixels is taken by a monochromatic CCD camera and quantized to get data of a digital image of 256 gray levels.

Figure 10:
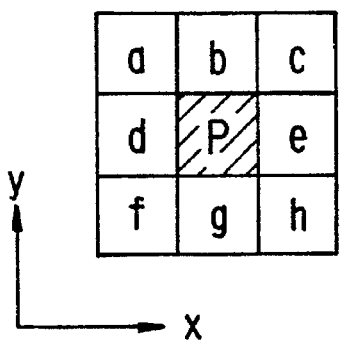
FIG. 10 shows a region of 3×3 pixels with a remarkable pixel in the center.

The obtained image data is transmitted to the edge detecting portion 2 wherein the Sobel operation is conducted using a filter for 3×3 pixels for edge detection. Practically, in a cell of 3×3 pixels including a remarkable pixel P in the center thereof as shown in FIG. 10, edge strength and edge direction of the remarkable pixel P is determined according to the following expressions:

$$\text{Edge Strength} = \sqrt{Sx^2 + Sy^2}$$

$$\text{Edge Direction} = \tan^{-1}(Sx/Sy) \text{ [deg]}$$

where $Sx=(c+2e+h)-(a+2d+f)$ and $Sy=(f+2g+h)-(a+2b+c)$;

where characters a to h indicate gray levels of pixels (each is indicated by an integer within 0 to 255). By scanning the whole image with the above-mentioned filter processing it is possible to get an edge composed of dots each of which has information on the edge strength and the edge direction. In this processing, it is experimentally adopted that the dot detected with its edge strength not more than 5 is not granted as an edge pixel.

Figure 11:
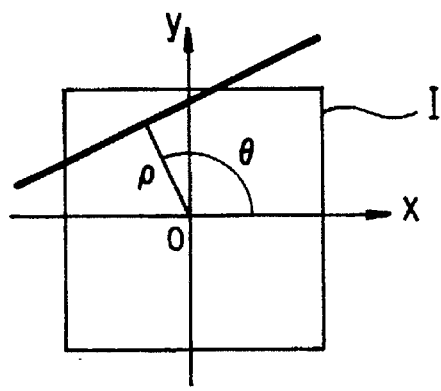
FIG. 11 shows Hough coordinates of dots of an edge, which was obtained by Hough transformation of the line segment representing an edge of a picture image.

The obtained data on the edge strength and direction of the image of 512×512 pixels is transferred to the Hough transform portion 3 wherein each dot (x, y) lying on an edge in a picture image I as shown in FIG. 11 is transformed into a Hough function curve.

Figure 12:
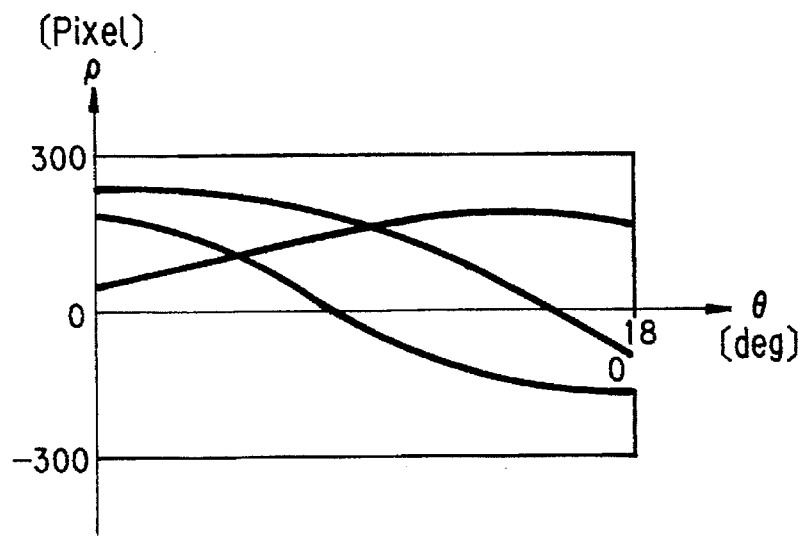
FIG. 12 shows an example of a histogram of Hough function curves (ρ-θ).

In the histogram plotting portion 4, the values of the Hough functions are put into respective meshes in a plane ρ-θ to form a histogram of values ρ-θ as shown in FIG. 12. The mesh size, since it is width of a minimum division of the histogram, may affect the sensitivity of line detection and is preset to an experimentally adequate value. A mesh the width for the ρ-θ histogram is set, for example, to θ=1 [deg.] and ρ=2 [pixels]. A region limited by ρ and θ is set to, e.g., θ=0~180 deg. and ρ=−300~300 pixels.

According to a program previously prepared in the line-segment extracting portion 5, the maximum peak is detected from the histogram plotted by the histogram plotting portion 4 and a line-segment corresponding to the detected maximum peak is selected, then a region and an amount of the peak's influence upon the frequency distribution on the histogram are determined and the histogram frequency values of other peaks in the defined region are corrected for the determined amount of influence of the detected maximum peak. After this, the next largest peak is found in the partially corrected histogram and a line segment corresponding thereto is extracted. The same processing will be repeated for the next peak.

Figure 2:
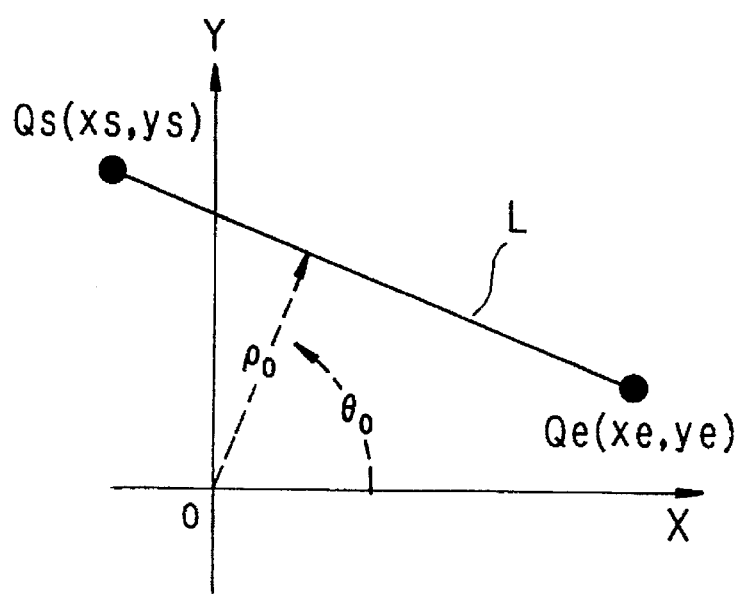
FIG. 2 is a view showing a line segment L located in a two-dimensional system of the Cartesian coordinates (x, y).
Figure 3:
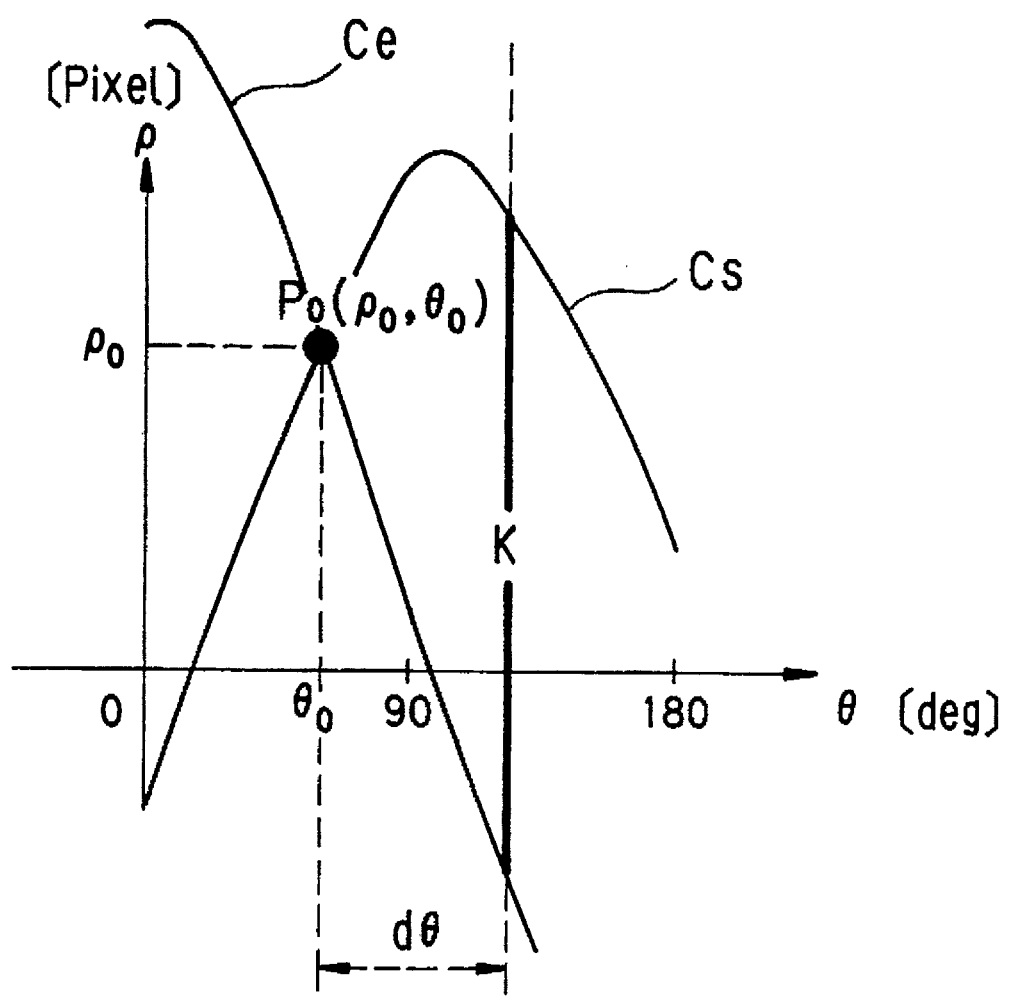
FIG. 3 shows Hough function curves obtained by Hough transformation of dots lying at both ends of the line segment L shown in FIG. 2.

The region and the amount of influence of a remarkable peak upon the frequency distribution on the histogram can be determined in practice as follows:

Dots Qs (Xs, Ys) and Qe (Xe, Ye) at both ends of a line segment L located in a two-dimensional system of the Cartesian coordinates shown in FIG. 2, are transformed into Hough function curves Cs and Ce with Hough coordinates (ρ, θ) as shown in FIG. 3 wherein the Hough function curves Cs and Ce correspond to the dots Qs and Qe respectively.

A line segment K is assumed, which is parallel to ρ-axis and lies between the Hough function curves Cs and Ce in a plane of θ=θo+dθ (separated from a point θo by a distance dθ). Since the Hough function curves representing respective sequential dots on the line segment L lie on the line segment K at equal intervals, the histogram frequency (number of occurrence) on the line segment K is substantially constant irrespective of the value ρ.

The following expression (1) is effected when the line segment K has a length l. The histogram frequency may be assumed as being evenly distributed within the length l of the line segment K.

$$P(\rho, \theta o+d\theta)=Po(\rho o,\theta o)/l\{\forall\rho|(\rho, \theta o+d\theta)EK\} \tag{1}$$

Since the boundary of the peak's influence region in the histogram, which corresponds to the dot Po, is determined by the Hough function curves Cs and Ce corresponding to both end-dots Qs and Qe respectively, the length l of the line segment K can be determined by the following equation (2):

$$l = \rho s - \rho e \quad (2)$$
$$= \{Xs^*\cos(\theta o + d\theta) + Ys^*\sin(\theta o + d\theta)\} -$$
$$\{Xe^*\cos(\theta o + d\theta) + Ye^*\sin(\theta o + d\theta)\}$$
$$= \sqrt{(Xs - Xe)^2 + (Ys - Ye)^2} \; *\sin(d\theta)$$

Accordingly, by substituting the equation (2) into the expression (1) it is possible to determine how much a dot Po (ρo, θo) with the Hough coordinates (ρ-θ) influences a histogram frequency of any point P (ρ, θ) within the line segment K on the histogram.

Figure 4:
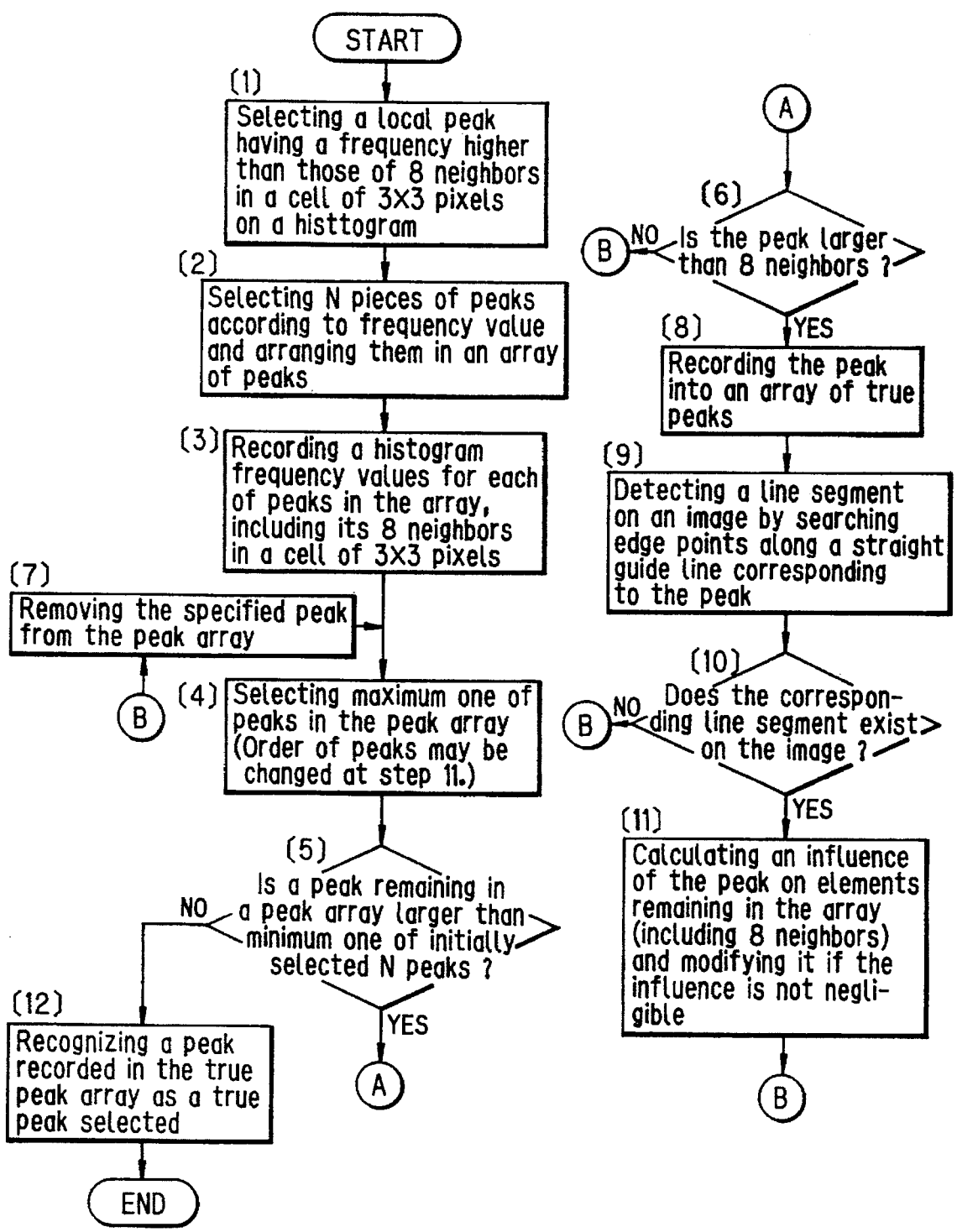
FIG. 4 is a flow chart of processing steps to successively select only true peaks corresponding to respective line segments of an image from a histogram.

FIG. 4 shows a processing flow chart for successively selecting only true peaks corresponding to line segments of an image from a histogram.

In step [1], all dots which are each at the center of a region of 3×3 pixels and have large histogram frequencies, are selected as local peaks from a histogram.

Figure 5:
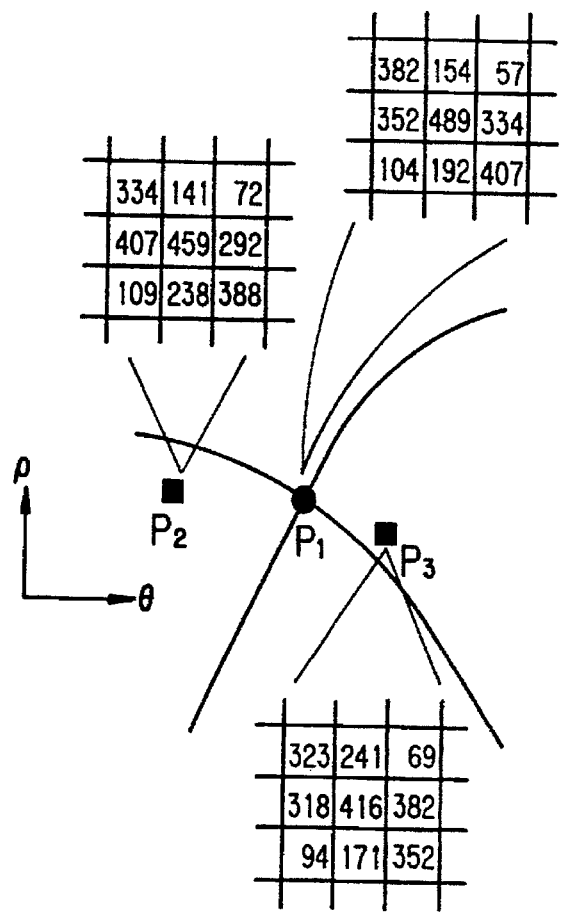
FIG. 5 shows a region (cell) of 3×3 pixels including in its center a remarkable peak on a histogram to be processed.
Figure 6:
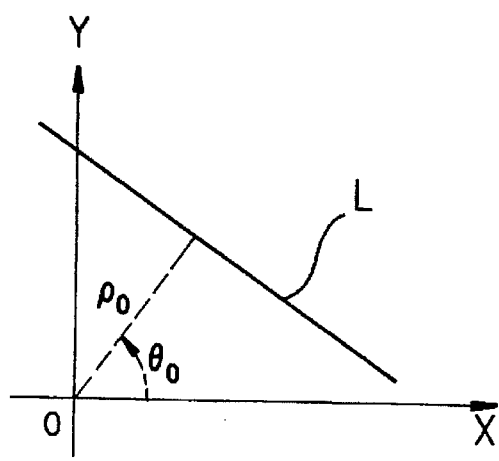
FIG. 6 is a view showing a line segment L located in a two-dimensional system of the Cartesian coordinates (x, y).
Figure 7:
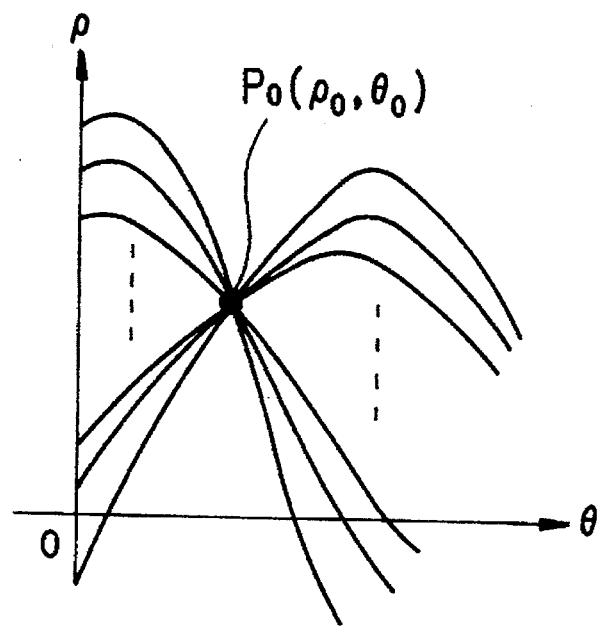
FIG. 7 shows Hough function curves obtained by Hough transformation of dots of a line segment L shown in FIG. 6.
Figure 8:
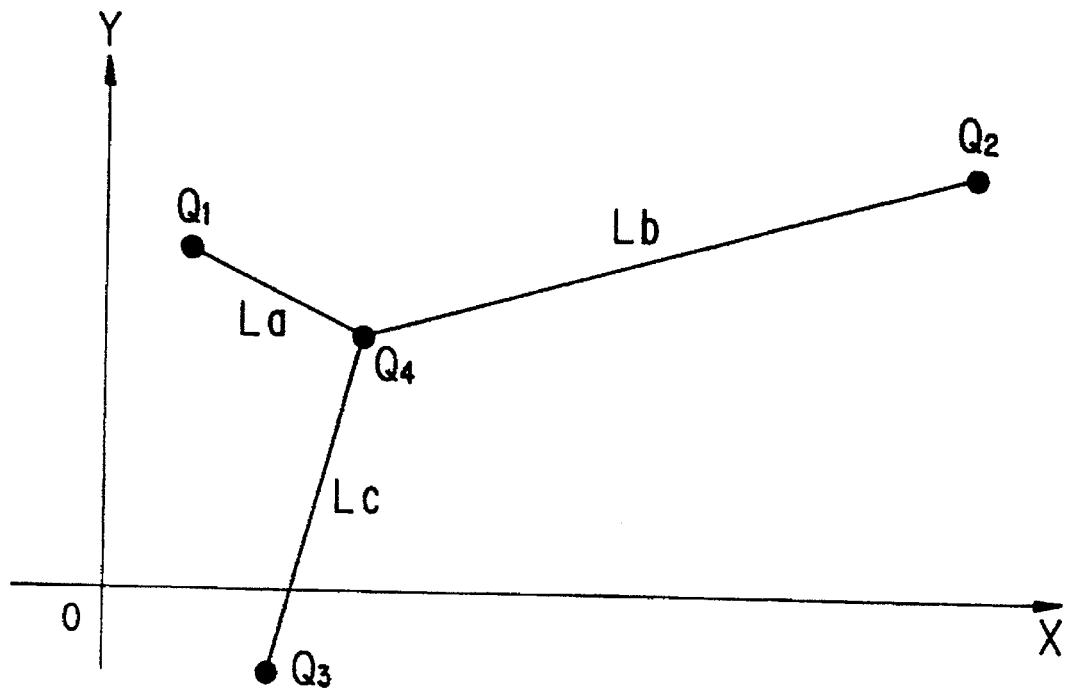
FIG. 8 is a view showing three line-segments located in a two-dimensional system of the Cartesian coordinates (x, y).
Figure 9:
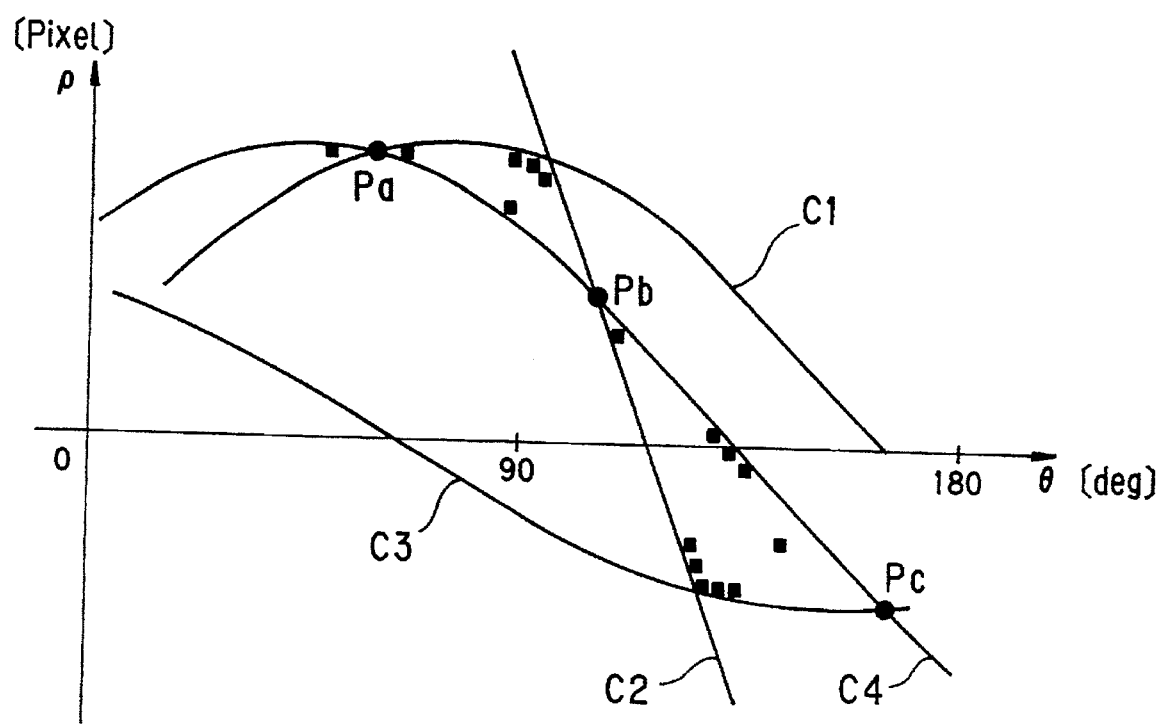
FIG. 9 shows Hough function curves obtained by Hough transformation of dots lying at both ends of the three line segments shown in FIG. 8.

For example, in FIG. 5, a peak P1 with the Hough coordinates (ρ, θ) is selected as a local peak since its histogram frequency of 489 is larger than that of any of 8 neighbors. Peaks P2 and P3 are subsequently selected for the same reason.

In steps [2] and [3], N (e.g., 50) pieces of the larger peaks are selected from all the peaks collected in Step [1] and are brought into an array of peaks. Steps [4] to [12] are to conduct the following processing operations:

The largest peak among the peaks in the first array is selected as a true peak and put into a list of true peaks. At the same time, edge points are searched along a corresponding straight line and both ends are determined.

Figure 13:
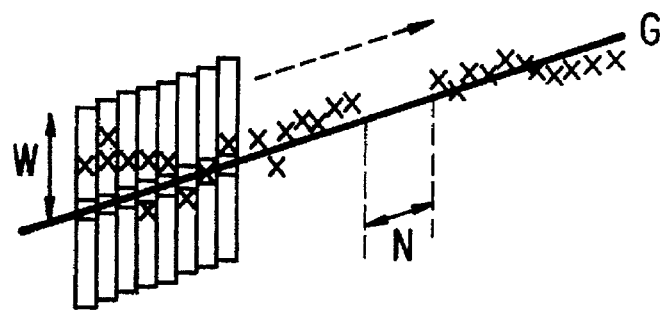
FIG. 13 shows an example of scanning edge dots along a guide line.

In seeking edge dots along the straight line, a peak in the ρ-θ histogram only represents a straight line and both ends of the line segment are unknown. Accordingly, it is necessary to search edge dots along a straight line (in the image) corresponding to a remarkable peak to determine an actual line segment. As shown in FIG. 3, a straight line G in a plane x-y corresponding to the remarkable peak (ρ, θ), is selected as a guide line along which a specified region is scanned pixel by pixel from array to array with a scanning width W of, e.g., 5 pixels at each side from the guide line, checking whether each edge dot exists or not. If two or more edge dots are in a scanned array, the strongest edge dot is chosen. In FIG. 13, marks x are actual edge dots and character N indicates a section wherein no edge dot exists. An arrow with a dotted line indicates the direction of searching edge dots.

Figure 14:
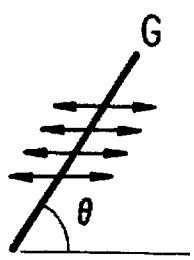
FIG. 14 shows a state of scanning in the horizontal direction according to a slope of a guide line.
Figure 15:
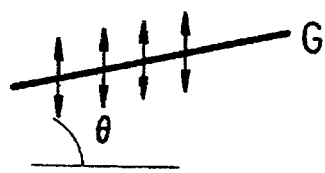
FIG. 15 shows a state of scanning in the vertical direction according to a slope of a guide line.

The both sides with the width W at each side from the guide line G, as shown in FIGS. 14 and 15 is scanned horizontally when θ≧45 deg. and vertically when θ<45 deg. according to an inclination angle θ of the guide line G. One method is to assume edge dots existing at both ends on the guide line G as both ends of the line segment. These dots, however, may be isolated dots. Therefore, they must be checked for continuity of their distribution.

Figure 16:
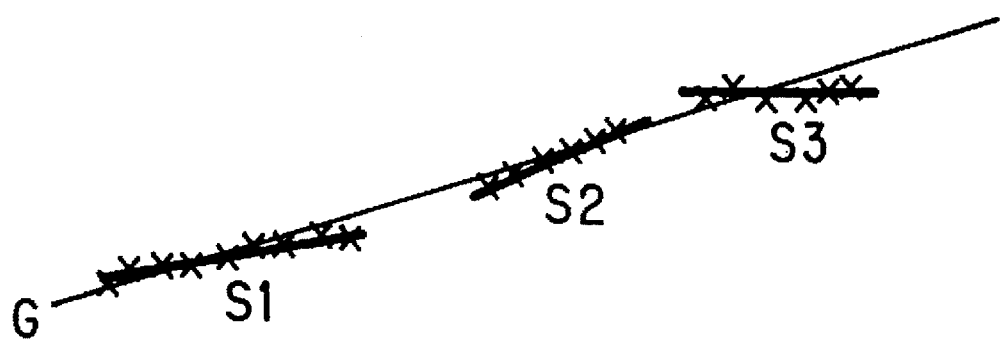
FIG. 16 shows a line segment consisting of a sequence of dots along a guide line.

FIG. 16 shows a method of determining both ends of a line segment, whereby line segments S1, S2 and S3 are formed of respective groups of successive edge-dots and then all such segments which have a direction that is apart from the guide line by an angle of, e.g., 40 deg. are omitted and each of the segments that remain is recognized as a line segment. Both ends of the line segment are thus defined.

Figure 17:
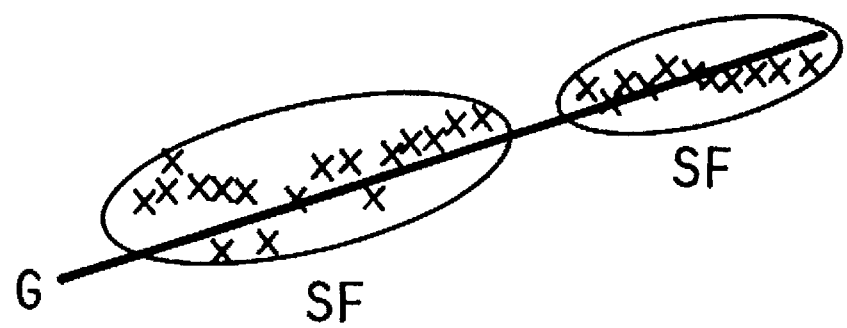
FIG. 17 shows a line-segment component consisting of a sequence of dots along a guide line.

In extracting a line segment existing on the guide line G according to the edge dots, a region, wherein a sequence of continuous edge dots is found, is assumed as segment component SF, as shown in FIG. 17. A plurality of segment components SF can be produced on a guide line G.

A group of edge dots of each component SF is approximated to a straight line by the method of least squares, whereby a segment is determined and its both ends are defined according to coordinates of edge dots lying at both ends of the segment.

At this time, a few isolated edge dots (processed by external affects such as a noise) may also be components of the segment. The linear approximation produces such segments which considerably differ in direction from the guide line G. Therefore, it is necessary to combine necessary segments and to eliminate different segments. The combined segments are linearly approximated again based on the edge dots belonging to both segments. Both ends of the line segment are now determined.

Conditions for combining two or more segments may be described as follows:

(1) A clearance between segments must be less than a specified value (e.g. 10 pixels);

(2) The shorter one of the two segments must be larger then the specified clearance value;

(3) A difference between mean values in the direction of edges belonging to each segment must be not more than a specified value (e.g., 20 degrees).

Inadequate segments are removed after combining the adequate segments.

Conditions of an inadequate segment to be removed may be as follows:

(1) The segment's length is not more than a specified value (e.g. 5 pixels); or (2) The segment differs from the guide line G in parameters ρ and θ in its edge direction by more than the specified values (e.g. 5 pixels and 5 deg. respectively); or (3) A difference between a mean value θ in edge direction of the segment and the value θ of the guide line G is not less than a specified value (e.g. 10 deg.); or (4) A total strength of edges belonging to the segment is not more than a specified value (e.g., 300).

Each finally remaining segment is registered as a line segment existing on the guide line corresponding to a currently remarkable peak. If the remarkable peak (straight line) be a result of wrong detection, few edges may appear near the straight line. In this case, the segment is removed.

Influence of the line segment lying on the guide line G upon other peaks on the ρ-θ histogram can be eliminated in the following way:

In an area between Hough function curves for both ends of the line segment, all of the peaks (ρ-θ) in a peak array, which are still not judged as true peaks, and respective 8 neighbors are chosen and an amount of the influence upon each of them is calculated, then frequency values of each peak and its neighbors on the histogram are corrected by reducing the determined influence value from the respective frequency values.

The reason for using a cell of 3×3 pixels including a remarkable pixel in the center thereof is that false peaks may be found to be not local peaks after the correction for influence of the maximum peak is conducted.

In calculating the influence value according to the equations (1) and (2), it is necessary to use total numbers of edge points belonging to the line segment in place of Po (ρo, θo), i.e., a total number of all edge dots lying on the guide line G.

If no line segment is detected on the guide line G, the step to eliminate the influence is omitted and the next largest peak is selected to be processed from the step for its edge scanning.

When a plurality of line segments are found on the guide line G, the step to eliminate the influence of a line segment upon other peaks is conducted for each of the line segments.

The remarkable peak corresponding to the guide line G is registered as a true peak, then the largest peak next to the registered one is selected among the peaks corrected for the influence of the registered peak and, then, a straight line corresponding to the selected peak is set as a new guide line. The processing steps are repeated again to search edges along the guide line, to extract line segments lying on the guide line according to the detected edges and to eliminate the influence of the line segment upon other peaks.

The above-mentioned processing cycle is repeated until the next largest peak is found to be smaller than the N-th least peak in the array of N peaks previously selected. It is also possible to make the processing end when the next largest peak is found to be smaller than any preset threshold value. Finally, line segments lying on the straight lines corresponding to the respective true peaks registered in a list of truepeaks are recognized as really existing line segments.

As is apparent from the foregoing description, the a line-segment extracting apparatus according to the present invention, which in the process of successively detecting peaks from the histogram based on Hough transforms of the data on edges in a picture image to extract line segments, can quantitatively determine a region and an amount of influence of a remarkable peak upon frequency distribution of the histogram and partially correcting the histogram for the influence to effectively eliminate false peaks from the histogram.

Since the apparatus partially corrects the current histogram without repeating the calculation for plotting a new histogram, it can work with a reduced load of data processing and can precisely extract a number of line segments from the image at an increased speed.

Since the apparatus according to the present invention quantitatively estimates a region and an amount of influence of a strong peak upon frequency distribution on the histogram, it can correctly detect true peaks, eliminating false peaks and is capable of reliably extracting each of the line segments which have peaks that are close to each other in plane $\rho$-$\theta$ of Hough coordinates while the segments are separated from each other on an image.

What is claimed is:

1. An image line-segment extracting apparatus which extracts a sequence of pixels (dots) of an edge in an image from a digital image composed of pixels, conducts Hough transformation of the sequence of pixels, plots a histogram according to the Hough transform function values, detects a peak of frequency on the histogram, and extracts a line segment corresponding to the detected peak from the image, characterized in that:

the apparatus includes means to determine a scope in which influence may appear and an amount of influence that may prevent the extraction of a line segment of a specified peak to be an object of line segment extracting processing detected on the histogram upon frequency distribution thereof;

means to determine whether another peak besides the specified peak exists in the region of influence;

means to correct a histogram frequency value of each of detected peaks other than the specified peak and their neighboring points in the histogram defined to be in the region of influence according to the determined amount of influence; and means for detecting a peak in the corrected histogram and then extracting a line segment corresponding to said peak in the corrected histogram detected by said detecting means.

2. An image line-segment extracting apparatus which extracts a sequence of pixels of an edge in an image from a digital image composed of pixels, conducts Hough transformation of the sequence of pixels, plots a histogram according to the Hough transform function values, detects a peak of frequency on the histogram, and extracts a line segment corresponding to the detected peak from the image, characterized in that;

the apparatus includes means to determine a scope in which influence may appear and an amount of influence that may prevent extraction of a line segment of a specified peak to be an object of line segment extracting processing detected on the histogram upon frequency distribution thereof;

means to determine whether another peak besides the specified peak exists in the region of influence;

means to correct a histogram frequency value of each of the detected peaks other than the specified peak and their neighboring points in the histogram, defined to be in the region of influence according to the determined amount of influence;

means for determining Hough function curves of both ends Qs (Xs, Ys) and Qe (Xe, Ye) of a straight line located in a two-dimensional (X-Y) coordinate system, said straight line corresponding to a specified peak Po ($\rho$o, $\theta$o); where $\rho$ and $\theta$ are Hough coordinate axes, (Ys, Ys) indicates a position of a point Qs at one end of a line in the (X-Y) coordinate system and (Xe, Ye) indicates a position of a point Qe at the other end of the line in the (X-Y) coordinate system;

means for calculating an amount of influence of the specified peak Po upon any peak P ($\rho$, $\theta$o+d$\theta$) in a region K in a Hough coordinate system according to expressions:

$$P(\rho, \theta o + d\theta) = Po(\rho o, \theta o)/l\{\forall p | (\rho, \theta o + d\theta) \in K\}. \quad (1)$$

$$l = \sqrt{(Xs - Xe)^2 + (Ys - Ye)^2} \cdot \sin(d\theta) \quad (2)$$

where l is an interval of direction of $\rho$-axis in each Hough function curve at a position apart from a point $\theta$o by a distance d$\theta$ in the Hough coordinate system and wherein K is a line segment that is parallel to a $\rho$-axis in each Hough function curve at a position (Po+d$\theta$) apart from $\theta$o by d$\theta$; and means for detecting a peak in the corrected histogram and then extracting a line segment corresponding to said peak in the corrected histogram detected by said detecting means.

3. An image line-segment extracting apparatus as defined in claim 2, characterized in that the apparatus is capable of detecting a sequence of searched edge points as a line segment.

* * * * *